(12) United States Patent
Onodera et al.

(10) Patent No.: US 8,448,671 B2
(45) Date of Patent: May 28, 2013

(54) LIGHT-WEIGHT AIR CONDITIONING DUCT FOR VEHICLE

(75) Inventors: Masaaki Onodera, Kanagawa (JP); Takehiko Sumi, Tokyo (JP); Teruo Tamada, Kanagawa (JP); Yu Igarashi, Kanagawa (JP); Yoshinori Ohno, Kanagawa (JP)

(73) Assignee: Kyoraku Co., Ltd., Kyoto-shi, Kyoto (JP)

( * ) Notice: Subject to any disclaimer, the term of this patent is extended or adjusted under 35 U.S.C. 154(b) by 453 days.

(21) Appl. No.: 12/736,331

(22) PCT Filed: Mar. 31, 2009

(86) PCT No.: PCT/JP2009/001518
§ 371 (c)(1),
(2), (4) Date: Nov. 1, 2010

(87) PCT Pub. No.: WO2009/122734
PCT Pub. Date: Oct. 8, 2009

(65) Prior Publication Data
US 2011/0056584 A1 Mar. 10, 2011

(30) Foreign Application Priority Data
Mar. 31, 2008 (JP) .................................. 2008-093895

(51) Int. Cl.
*F16L 9/14* (2006.01)

(52) U.S. Cl.
USPC .......................... 138/141; 138/137; 428/36.92

(58) Field of Classification Search
USPC ................................ 138/141, 137; 428/36.92
See application file for complete search history.

(56) References Cited

U.S. PATENT DOCUMENTS

| | | | |
|---|---|---|---|
| 2003/0051764 A1* | 3/2003 | Jungers | 138/149 |
| 2003/0211310 A1* | 11/2003 | Haas et al. | 428/318.6 |
| 2007/0031622 A1* | 2/2007 | Imanari et al. | 428/36.5 |
| 2010/0071289 A1* | 3/2010 | Princell et al. | 52/309.6 |
| 2011/0048571 A1* | 3/2011 | Onodera et al. | 138/177 |
| 2013/0052377 A1* | 2/2013 | Tani et al. | 428/34.1 |

FOREIGN PATENT DOCUMENTS

| | | |
|---|---|---|
| JP | 2006-205831 | 8/2006 |
| JP | 2006-273278 | 10/2006 |

* cited by examiner

*Primary Examiner* — James Hook
(74) *Attorney, Agent, or Firm* — Flynn, Thiel, Boutell & Tanis, P.C.

(57) ABSTRACT

[Problem] To provide a light-weight air conditioning duct for vehicle that is light in weight and excellent in mechanical strength.
[Solution] The present invention is directed to a light-weight air conditioning duct for vehicle 1 for letting conditioned air supplied from an air conditioning unit pass through to a desired location, the duct being obtained by blow-molding a mixed resin including a polypropylene-based resin for foaming and a hydrogenated styrene-based thermoplastic elastomer, and the duct having an Izod impact strength equal to or larger than 10 J/m at −20 degrees Celsius.

5 Claims, 4 Drawing Sheets

LIGHT-WEIGHT AIR CONDITIONING DUCT FOR VEHICLE

TECHNICAL FIELD

The present invention relates to light-weight air conditioning ducts for vehicles.

BACKGROUND ART

Air conditioning ducts for vehicles for letting conditioned air supplied from an air conditioning unit pass through to a desired location have been known.

Since such air conditioning ducts require light-weight and heat-insulation properties, foamed resin-molded articles are generally used.

Meanwhile, in such air conditioning ducts, various functionalities can be improved by adjusting a foamed state.

For example, to provide sound-absorbing and sound-attenuating effects, a hollow molded article with its inner surface foam-broken (for example, refer to Patent Document 1) and a duct with its surface hardness and air-bubble deformation ratio specified (for example, refer to Patent Document 2) are disclosed and, to prevent the occurrence of condensation on the outer surface of the air conditioning duct, a foam duct with its surface roughness specified (for example, refer to Patent Document 3) and an air duct for vehicle in a multilayered structure (for example, refer to Patent Document 4) are disclosed.

Patent Document 1: Japanese Examined Patent Application Publication No. 08-25230
Patent Document 2: Japanese Patent No. 3997334
Patent Document 3: Japanese Unexamined Patent Application Publication No. 2005-241157
Patent Document 4: Japanese Unexamined Patent Application Publication No. 2006-205831

DISCLOSURE OF INVENTION

Problems to be Solved by the Invention

However, the mechanical strength, such as tension strength, of the conventional air conditioning ducts including the air conditioning ducts described in Patent Documents 1 to 4 above is insufficient.

For example, in a vehicular roof side air conditioning duct, when a curtain air bag for protecting a passenger from a lateral collision is developed with a burst of compressed gas, the roof side air conditioning duct may be shattered and cracked due to an impact at the time of development.

On the other hand, in order to enhance fuel economy and reduce materials, weight saving of the air conditioning duct is desired. Note that, when the expansion ratio of the air conditioning duct is increased in order to enhance light-weight and heat-insulating properties, the mechanical strength is decreased.

The present invention have been devised in view of the circumstances described above, and has an object of providing a light-weight air conditioning duct for vehicle that is light in weight and excellent in mechanical strength.

Means for Solving the Problems

With diligent studies to solve the problems described above, the inventors have found that the problems described above can be solved by using predetermined materials for blow-molding and setting a predetermined Izod impact strength, thereby completing the present invention.

That is, the present invention is directed to (1) a light-weight air conditioning duct for vehicle for letting conditioned air supplied from an air conditioning unit pass through to a desired location, the duct being obtained by blow-molding a mixed resin including a polypropylene-based resin for foaming and a hydrogenated styrene-based thermoplastic elastomer, and the duct having an Izod impact strength equal to or larger than 10 J/m at −20 degrees Celsius.

The present invention resides in (2) the light-weight air conditioning duct for vehicle according to (1) described above, wherein the duct has a closed-cell structure with an expansion ratio equal to or higher than 2.0, and the duct has a tensile rupture extension equal to or higher than 40% at −10 degrees Celsius, and has a tensile modulus of elasticity equal to or higher than 1000 kg/cm$^2$ at a room temperature.

The present invention resides in (3) the light-weight air conditioning duct for vehicle according to (1) or (2) described above, wherein the polypropylene-based resin for foaming is a propylene homopolymer having a long-chain branching structure.

The present invention resides in (4) the light-weight air conditioning duct for vehicle according to any one of (1) to (3) described above, wherein the hydrogenated styrene-based thermoplastic elastomer is at least one member selected from the group consisting of a styrene-ethylene butylene-styrene block copolymer, a styrene-ethylene propylene-styrene block copolymer, and a hydrogenated styrene-butadiene rubber.

The present invention resides in (5) the light-weight air conditioning duct for vehicle according to any one of (1) to (4) described above, wherein the hydrogenated styrene-based thermoplastic elastomer has a styrene content smaller than 30 wt % and an MFR of 1.0 to 10 g/ten minutes at 230 degrees Celsius.

The present invention resides in (6) the light-weight air conditioning duct for vehicle according to any one of (1) to (5) described above, wherein the polypropylene-based resin for foaming in the mixed resin has a composition ratio of 60 to 95 wt %, and the hydrogenated styrene-based thermoplastic elastomer has a composition ratio of 5 to 40 wt %.

The present invention resides in (7) the light-weight air conditioning duct for vehicle according to any one of (1) to (6) described above, wherein the mixed resin further includes a polyolefin-based copolymer.

The present invention resides in (8) the light-weight air conditioning duct for vehicle according to any one of (1) to (7), wherein the duct is a roof side duct.

Effects of the Invention

The light-weight air conditioning duct for vehicle of the present invention is obtained by blow-molding a predetermined mixed resin, and therefore can be light-weight and highly-foamed. Also, with a predetermined Izod impact strength, shattered cracking can be suppressed even when an impact applies due to, for example, development of a curtain air bag at a low temperature. Note that the Izod impact strength can be adjusted within a predetermined range by adjusting the composition rate of the hydrogenated styrene-based thermoplastic elastomer in the mixed resin.

Thus, the light-weight air conditioning duct for vehicle described above is light in weight, excellent in mechanical strength, and resistant to breakage, such as shattered cracking.

With a closed-cell structure with an expansion ratio equal to or higher than 2.0, a tensile rupture extension equal to or higher than 40% at −10 degrees Celsius, and a tensile modulus of elasticity equal to or higher than 1000 kg/cm$^2$ at a room temperature, the light-weight air conditioning duct for vehicle described above has a uniform mechanical strength, and is also excellent in stiffness, impact resistance, and durability with respect to temperature and humidity changes.

With the polypropylene-based resin for foaming being a propylene homopolymer having a long-chain branching structure, the solvent tension of the light-weight air conditioning duct for vehicle described above is increased, thereby obtaining a higher expansion ratio.

With the hydrogenated styrene-based thermoplastic elastomer being at least one member selected from the group consisting of a styrene-ethylene butylene-styrene block copolymer, a styrene-ethylene propylene-styrene block copolymer, and a hydrogenated styrene-butadiene rubber, the impact resistance strength of the light-weight air conditioning duct for vehicle described above is reliably improved without decreasing the mechanical strength.

With the hydrogenated styrene-based thermoplastic elastomer having a styrene content smaller than 30 wt % and an MFR of 1.0 to 10 g/ten minutes at 230 degrees Celsius, the impact resistance strength of the light-weight air conditioning duct for vehicle described above can be further improved without decreasing the mechanical strength.

BRIEF DESCRIPTION OF DRAWINGS

FIG. 1(a) is a perspective view when a light-weight air conditioning duct for vehicle according to the present embodiment is used as a roof side duct, and (b) is a section view along an arrow X-X' in (a).

BEST MODES FOR CARRYING OUT THE INVENTION

In the following, with reference to the drawings as required, preferred embodiments of the present invention are described in detail. Note in the drawings that the same elements are provided with the same reference numeral, and redundant description is omitted. Also, it is assumed that a positional relation, such as above, below, left, and right, is based on the positional relation shown in the drawings unless otherwise specified. Furthermore, the dimensional ratio of each drawing is not restricted to those as shown.

First Embodiment

As a first embodiment, the case in which the light-weight air conditioning duct for vehicle of the present invention is a roof side duct is described.

Figures 1A, 1B:
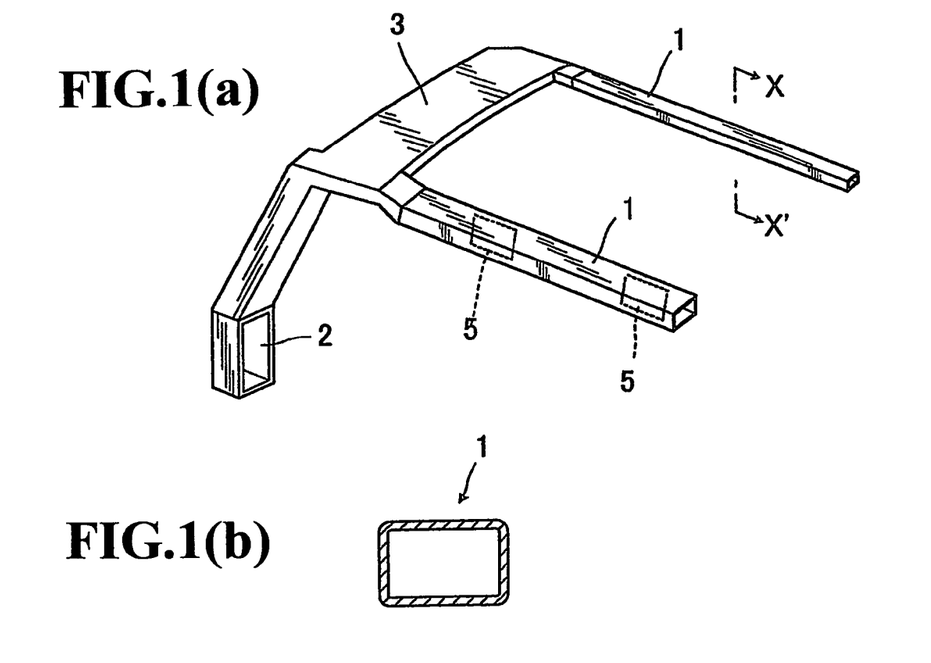

In FIG. 1(a) is a perspective view when the light-weight air conditioning duct for vehicle according to the present embodiment is used as a roof side duct, and (b) is a section view along an arrow X-X' in (a).

As depicted in FIGS. 1(a) and (b), a light-weight air conditioning duct for vehicle (hereinafter referred to as a "roof side duct") 1 according to the present embodiment is to let the conditioned air supplied from an air conditioning unit pass through to a desired location.

This roof side duct 1 has a shape of a hollow polygonal column, and is integrally molded by blow molding. Note that blow molding will be described further below.

The roof side duct 1 is supported by a flat-shaped crossing duct 3.

At one end of the crossing duct 3, an air supply port 2 for supplying conditioned air is provided. The conditioned air supplied from the air supply port is distributed inside not shown of the crossing duct to flow into the hollow portion of the roof side duct 1.

Then, the conditioned air flowing thereinto is discharged from air discharge ports 5 provided to the roof side duct 1.

The roof side duct 1 has an average thickness of a wall part 1a equal to or smaller than 3.5 mm. In this manner, by making the thickness of the wall part 1a of the roof side duct 1 thin, the flow path of conditioned air passing through inside the roof side duct 1 can be set wide.

Also, the average air-bubble diameter of each air-bubble cell in a thickness direction of the wall part 1a is preferably smaller than 300 μm. In this case, there is an advantage of further increasing the mechanical strength. Note that the average air-bubble diameter is more preferably smaller than 100 μm.

The roof side duct 1 has an Izod impact strength equal to or larger than 10 J/m, preferably, 20 to 45 J/m, at −20 degrees Celsius. Here, the Izod impact strength is a value obtained through a measurement in conformance with JIS K-7110 (with a notch).

When the Izod impact strength is smaller than 10 J/m, durability with respect to temperature changes is insufficient and, in particular, shattered cracking may occur due to an impact at a low temperature.

The roof side duct 1 has a closed-cell structure with an expansion ratio equal to or higher than 2.0. Here, the expansion ratio is a value obtained by dividing the density of a thermoplastic resin for use in foaming blow molding by an apparent density of the wall part 1a of the foaming blow-molded article. Also, the closed-cell structure is a structure having a plurality of air-bubble cells with a closed-cell ratio at least equal to or higher than 70%.

When the expansion ratio is lower than 2.0, compared with the case where the expansion ratio is within the range described above, weight reduction is insufficient, and the effect of heat insulation is low, thereby possibly causing condensation.

The roof side duct 1 preferably has a tensile rupture extension equal to or higher than 40%, more preferably, equal to or higher than 100%, at −10 degrees Celsius. Here, the tensile rupture extension is a value obtained through a measurement in conformance with JIS K-7113.

When the tensile rupture extension is lower than 40% at −10 degrees Celsius, compared with the case where the tensile rupture extension is within the range described above, shattered cracking may occur.

The roof side duct 1 preferably has a tensile modulus of elasticity equal to or higher than 1000 kg/cm$^2$, more preferably, 1100 to 1500 kg/cm$^2$, at a room temperature. Here, the tensile modulus of elasticity is a value obtained through a measurement in conformance with JIS K-7113.

When the tensile modulus of elasticity is lower than 1000 kg/cm$^2$ at a room temperature, compared with the case where the tensile modulus of elasticity is within the range described above, the roof side duct 1 may be deformed.

Figure 2:
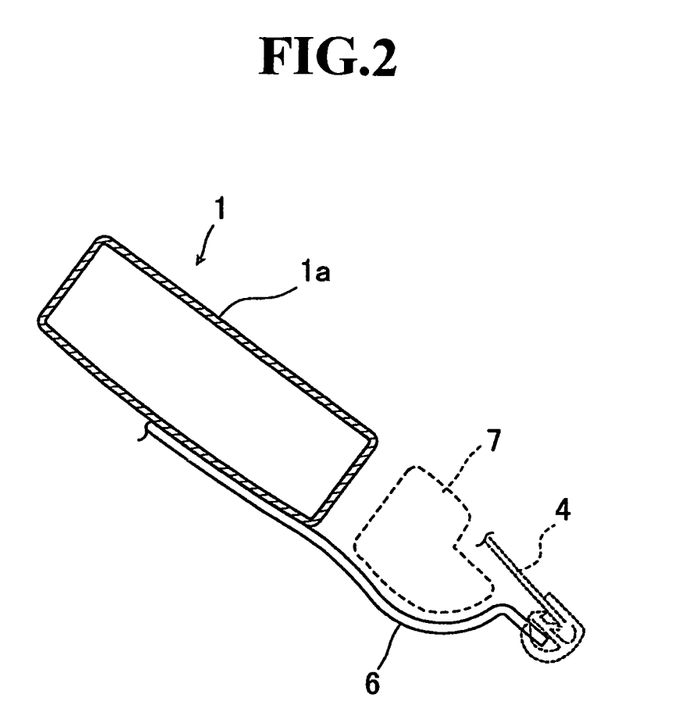
FIG. 2 is a section view when the light-weight air conditioning duct for vehicle according to the present embodiment is used as a roof side duct.

FIG. 2 is a section view when the light-weight air conditioning duct for vehicle according to the present embodiment is used as a roof side duct.

As depicted in FIG. 2, the roof side duct 1 is disposed in line with a curtain air bag 7 between a vehicle's interior ceiling material 6 and a vehicle body panel 4.

And, when the curtain air bag 7 is developed with compressed gas, an impact due to the development of the curtain air bag 7 is transferred to the roof side duct 1 disposed at the back of the curtain air bag 7.

As described above, since the roof side duct 1 according to the present embodiment has a predetermined Izod impact strength, shattered cracking can be suppressed even when an impact applies due to, for example, development of the curtain air bag at a low temperature. Thus, the light-weight air conditioning duct for vehicle described above is light in weight and excellent in mechanical strength and low-temperature impact resistance strength.

The light-weight air conditioning duct for vehicle according to the present embodiment is obtained by blow-molding a predetermined mixed resin.

This mixed resin includes a polypropylene-based resin for foaming and a hydrogenated styrene-based thermoplastic elastomer.

The polypropylene-based resin for foaming is not particularly restrictive as long as it is a polyolefin-based resin having an ethylene unit or a propylene unit in a molecule. Examples can include a polypropylene resin and an ethylene-propylene copolymer.

Among these, a polypropylene resin having a propylene homopolymer having a long-chain branching structure is preferable and, in addition, an ethylene propylene block copolymer is more preferable.

In this case, the melt tension is high, thereby obtaining a higher expansion ratio.

Note that the propylene homopolymer having a long-chain branching structure is preferably a propylene homopolymer having a weight-average branching index equal to or lower than 0.9. Also, a weight-average branching index g' is represented by V1/V2, where V1 is a limiting viscosity number of branched polyolefin and V2 is a limiting viscosity number of linear polyolefin having the same weight-average molecular weight as that of branched polyolefin.

As the polypropylene-based resin for foaming, a polypropylene having a melt tension within a range of 30 to 350 mN at 230 degrees Celsius is preferably used. Here, the melt tension means a melt tension. When the melt tension is within the range described above, the polypropylene-based resin for foaming shows a strain hardening property, thereby obtaining a high extension ratio.

The hydrogenated styrene-based thermoplastic elastomer is not particularly restrictive as long as it is a resin having a styrene unit with hydrogen added inside a molecule. Examples include: a hydrogenated styrene-butadiene rubber, such as a styrene-butadiene-styrene block copolymer, a styrene-isoprene-styrene block copolymer, and a styrene-butadiene random copolymer; a styrene-ethylene butylene-styrene block copolymer, and a styrene-ethylene propylene-styrene block copolymer. That is, when the hydrogenated styrene-based thermoplastic elastomer is at least one member selected from the group consisting of a styrene-ethylene butylene-styrene block copolymer, a styrene-ethylene propylene-styrene block copolymer, and a hydrogenated styrene-butadiene rubber, the mechanical strength is reliably increased.

The hydrogenated styrene-based thermoplastic elastomer preferably has a styrene content smaller than 30 wt % and, more preferably, smaller than 20 wt %.

When the styrene content exceeds 30 wt %, compared with the case where the styrene content is within the range described above, the extension ratio and blow moldability tend to decrease.

The hydrogenated styrene-based elastomer has a melt flow rate (MFR) of 10 g/ten minutes at 230 degrees Celsius, more preferably, 1 to 10 g/ten minutes and, still more preferably, 1 to 5 g/ten minutes. Here, the MFR is a value obtained through a measurement in conformance with JIS K-7210.

When the MFR is lower than 1.0 g/ten minutes, compared with the case where the MFR is within the range described above, an impact resistance property at a low temperature may not be obtained.

As for a composition ratio between the polypropylene-based resin for foaming and the hydrogenated styrene-based elastomer in the mixed resin, with respect to the total weight of the mixed resin, 5 to 40 wt % hydrogenated styrene-based elastomer is preferable, and 15 to 30 wt % is more preferable. Note that 45 to 95 wt % polypropylene-based resin for foaming is preferable, and 60 to 95 wt % is more preferable.

With this composition ratio, a highly-foamed article can be achieved while keeping a light weight, the impact resistance can be improved, and the stiffness as a light-weight air conditioning duct for vehicle can be kept.

The mixed resin described above may include a polyolefin-based copolymer as a third element.

Examples of this polyolefin-based copolymer include an ethylene-based copolymer and, more specifically, a low-density ethylene-α-olefin, a straight-chain very-low-density polyethylene, an ethylene-based elastomer, or a propylene-based elastomer.

Also, for such copolymerization, in view of impact resistance at a low temperature, a metallocene-based catalyst is preferably used.

The ethylene-α-olefin described above is preferably the one obtained by copolymerizing an ethylene and an α-olefin having a number of carbon atoms of 3 to 20. Note that a single type of α-olefin having a number of carbon atoms of 3 to 20 may be used, or two or more types thereof may be used together.

More specifically, the ethylene-α-olefin described above is more preferably the one obtained by copolymerizing ethylene and propylene, 1-butene, 1-pentene, 1-hexene, 1-heptene, 1-octene, 1-nonene, 1-decene, 1-dodecene, 4-methyl-1-pentene or 4-methyl-1-hexene and, still more preferably, the one obtained by copolymerizing ethylene and 1-butene, 1-hexene, or 1-octene.

The content of monomeric units based on ethylene in the ethylene-α-olefin copolymer is preferably within a range of 50 to 99 wt % with respect to the ethylene-α-olefin copolymer. Also, the content of monomeric units based on α-olefin is preferably within a range of 1 to 50 wt % with respect to the ethylene-α-olefin copolymer.

A polyolefin-based copolymer having a density equal to or lower than 0.91 g/cm$^3$ is suitably used in view of impact resistance at a low temperature.

The polyolefin-based copolymer described above is blended to the mixed resin in a range equal to or smaller than 20 wt %. In this case, the composition includes 60 to 95 wt % polypropylene-based resin for foaming, 5 to 40 wt % hydrogenated styrene-based elastomer, and 0 to 20 wt % polyolefin-based copolymer.

The mixed resin described above is foamed by using a foaming agent before blow molding.

Examples of the foaming agent include: an inorganic-based foaming agent, such as air, carbon dioxide gas, nitrogen gas, and water; or an organic-based foaming agent, such as butane, pentane, hexane, dichloromethane, and dichloroethane.

Among these, air, carbon dioxide gas, or nitrogen gas is preferably used as a foaming agent. In this case, mixture of a thing can be prevented, thereby suppressing a decrease in durability and the like.

Also, as a foaming method, a supercritical fluid is preferably used. That is, the mixed resin is preferably foamed with carbon dioxide gas or nitrogen gas being set in a supercritical state. In this case, air bubbles can be uniformly and reliably formed.

Note that, when the supercritical fluid is nitrogen gas, the condition can be such that the critical temperature is set at 149.1 degrees Celsius and the critical pressure is set equal to or higher than 3.4 MPa. When the supercritical fluid is carbon dioxide gas, the condition can be such that the critical temperature is set at 31 degrees Celsius and the critical pressure is set equal to or higher than 7.4 MPa.

The mixed resin subjected to a foaming process in the manner described above (hereinafter referred to as a "foamed mixed resin") is blow-molded with a known method.

Figure 3:
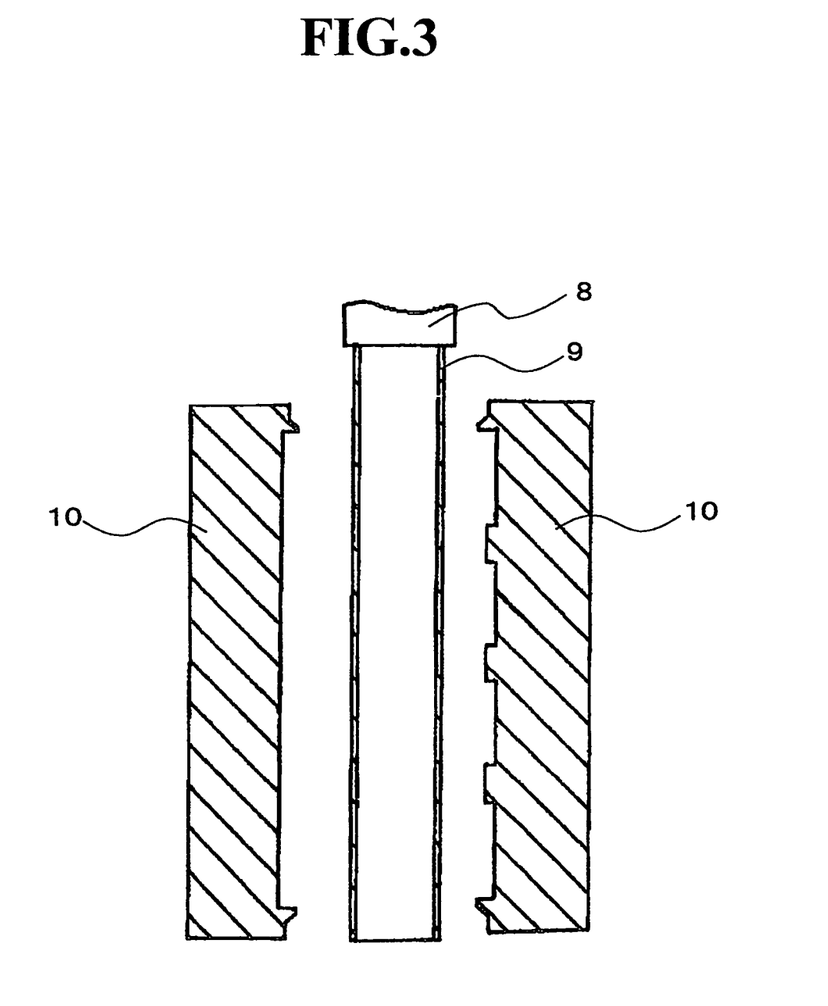
FIG. 3 is a section view of a mode when the light-weight air conditioning duct for vehicle according to the present embodiment is blow-molded.

FIG. 3 is a section view of a mode when the light-weight air conditioning duct for vehicle according to the present embodiment is blow-molded.

First, after the foamed mixed resin is kneaded by extruder (not shown), it is accumulated in an intra-die accumulator (not shown). Next, after a predetermined resin amount is accumulated, a ring-shaped piston (not shown) is pressed down vertically with respect to a horizontal direction.

Then, from a die slit of an extruding head 8 depicted in FIG. 3, the resin is extruded as a cylindrical parison 9 to a space between divided molds 10 at an extrusion speed equal to or faster than 700 kg/hour.

Thereafter, the divided molds 10 are clamped together to interpose the parison 9 therebetween, and air is infused into the parison 9 within a range of 0.05 to 0.15 MPa to form the roof side duct 1.

Second Embodiment

As a second embodiment, the case is described in which the light-weight air conditioning duct for vehicle of the present invention is an air conditioning duct disposed in a floor.

Figure 4:
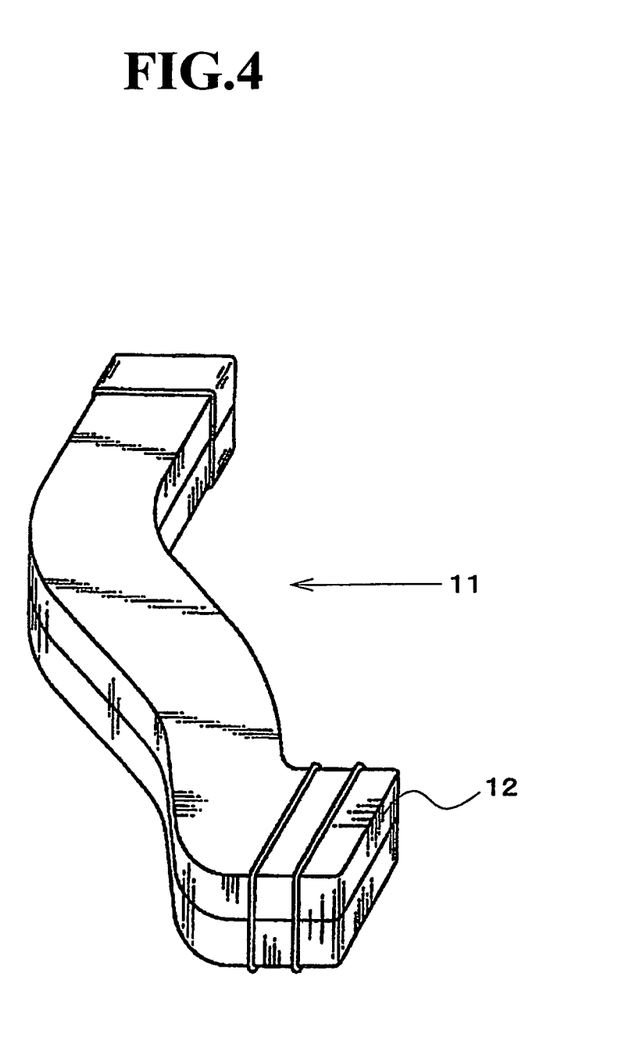
FIG. 4 is a perspective view when the light-weight air conditioning duct for vehicle according to the present embodiment is used as an air-conditioning floor duct.

FIG. 4 is a perspective view when the light-weight air conditioning duct for vehicle according to the present embodiment is used as an air-conditioning floor duct.

As depicted in FIG. 4, a light-weight air conditioning duct for vehicle (hereinafter referred to as a "floor duct") 11 according to the present embodiment is to let conditioned air supplied from an air conditioning unit pass through to a desired location.

The floor duct 11 is similar to the roof side duct 1 described above except that the duct bends in a three-dimensional direction. That is, the floor duct 11 has a shape of a hollow polygonal column, and is integrally molded by blow molding. Note that the floor duct 11 is used as being in an open state, with closed parts 12 at one end and the other end of the floor duct 11 cut out by post-processing after blow molding.

In the floor duct 11, conditioned air is distributed inside the floor duct 11 to be discharged from the opened portions.

EXAMPLES

In the following, the present invention is more specifically described based on examples and comparative examples. The present invention is not meant to be restricted to the following examples.

First, a polypropylene-based resin for foaming, a hydrogenated styrene-based thermoplastic elastomer, and a polyolefin-based copolymer as a third element prepared are as follows. Also, MFR values and styrene contents of these resins at 230 degrees Celsius are shown in Table 1. Note that a melt flow rate (an MFR value) is a value obtained through a measurement in conformance with JIS K-7210 at a test temperature of 230 degrees Celsius and a test load of 2.16 kg.

(Polypropylene-Based Resin for Foaming)

PP1: A propylene homopolymer having a long-chain branching structure (manufactured by SunAllomer Ltd.; product name: PF814; a melt tension at 230 degrees Celsius of 200 mN)

PP2: A crystalline ethylene-propylene block copolymer (manufactured by Japan Polypropylene Corporation; product name: NOVATEC PP EC9)

PP3: A propylene homopolymer (manufactured by Borealis AG; product name: Daploy WB130)

PP4: A crystalline ethylene-propylene block copolymer (manufactured by Japan Polypropylene Corporation; product name: NEWFORMER FB3312)

(Hydrogenated Styrene-Based Thermoplastic Elastomer)

TPE1: a Styrene-Ethylene Butylene-Styrene Block Copolymer (manufactured by Asahi Kasei Corporation; product name: TUFTEC H1062)

TPE2: A styrene-ethylene propylene-styrene block copolymer (manufactured by Kuraray Co., Ltd.; product name: SEPTON S2063)

TPE3: A hydrogenated styrene-butadiene rubber (manufactured by JSR Corporation; product name: DYNARON P1320P)

TPE4: A styrene-ethylene butylene-styrene block copolymer (manufactured by Mitsubishi Chemical Corporation; product name: Rabalon SE8400)

TPE5: A styrene-ethylene propylene-styrene block copolymer (manufactured by Kuraray Co., Ltd.; product name: SEPTON S2007)

(Polyolefin-Based Copolymer)

PE1: An ethylene-hexene-1 copolymer, which is a straight-chain very-low-density polyethylene polymerized with a metallocene-based catalyst (manufactured by Sumitomo Chemical Co., Ltd.; EXCELLEN CX2001; a density of 0.898 g/cm$^3$)

PE2: An ethylene-butene-1 copolymer (manufactured by Mitsui Chemicals, Inc.; TUFMER A4090; a density of 0.893 g/cm$^3$)

TABLE 1

| | MFR VALUE (g/ten minutes) | STYRENE CONTENT (wt %) |
|---|---|---|
| PP1 | 3.0 | — |
| PP2 | 0.5 | — |
| PP3 | 2.1 | — |
| PP4 | 5.1 | — |
| TPE1 | 4.5 | 18 |
| TPE2 | 7.0 | 13 |
| TPE3 | 3.5 | 10 |
| TPE4 | 0.6 | DATA UNAVAILABLE |
| TPE5 | 2.4 | 30 |
| PE1 | 2.0 | — |
| PE2 | 3.6 | — |

First Example 70 wt % PP1, 10 wt % PP2, and 20 wt % TPE1 were mixed to form a mixed resin.

And, to this mixed resin, nitrogen in a supercritical state as a foaming agent, 3 parts by weight of talc MB as a nucleating agent, and 1 part by weight of black MB as a coloring agent were added for foaming to form a foamed resin. After kneaded by an extruder, this resin was accumulated in an intra-die accumulator, which is a cylindrical space between a mandrel and a die outer cylinder, was extruded by using a ring-shaped piston to divided molds as a cylindrical parison. After mold clamping, with air infused into the parison with a pressure of 0.1 MPa, a blow-molded sample A was obtained.

Second Example 60 wt % PP1, 10 wt % PP2, and 30 wt % TPE1 were mixed to form a mixed resin.

Thereafter, with processes similar to those of the first example, a blow-molded sample B was obtained.

Third Example 70 wt % PP1, 10 wt % PP2, and 20 wt % TPE2 were mixed to form a mixed resin.

Thereafter, with processes similar to those of the first example, a blow-molded sample C was obtained.

Fourth Example 70 wt % PP1, 10 wt % PP2, and 20 wt % TPE3 were mixed to form a mixed resin.

Thereafter, with processes similar to those of the first example, a blow-molded sample D was obtained.

Fifth Example 70 wt % PP1, 20 wt % TPE1, and 10 wt % PE1 were mixed to form a mixed resin.

Thereafter, with processes similar to those of the first example, a blow-molded sample E was obtained.

Sixth Example 70 wt % PP3, 10 wt % PP4, and 20 wt % TPE1 were mixed to form a mixed resin.

Thereafter, with processes similar to those of the first example, a blow-molded sample F was obtained.

Seventh Example 45 wt % PP1, 10 wt % PP2, and 45 wt % TPE1 were mixed to form a mixed resin.

Thereafter, with processes similar to those of the first example, a blow-molded sample G was obtained.

Eighth Example 70 wt % PP1, 10 wt % PP2, and 20 wt % TPE4 were mixed to form a mixed resin.

Thereafter, with processes similar to those of the first example, a blow-molded sample H was obtained.

Ninth Example 70 wt % PP1, 10 wt % PP2, and 20 wt % TPE5 were mixed to form a mixed resin.

Thereafter, with processes similar to those of the first example, a blow-molded sample I was obtained.

First Comparative Example 70 wt % PP1 and 30 wt % PP2 were mixed to form a mixed resin.

Thereafter, with processes similar to those of the first example, a blow-molded sample J was obtained.

Second Comparative Example 70 wt % PP1, 10 wt % PP2, and 20 wt % PE1 were mixed to form a mixed resin.

Thereafter, with processes similar to those of the first example, a blow-molded sample K was obtained.

Third Comparative Example 70 wt % PP1, 10 wt % PP2, and 20 wt % PE2 were mixed to form a mixed resin.

Thereafter, with processes similar to those of the first example, a blow-molded sample L was obtained.

Physical properties of the samples A to L obtained in the first to ninth examples and the first to third comparative examples were evaluated as follows.

1. Tensile Rupture Extension

A wall part of each of the samples A to L was cut out, stored at −10 degrees Celsius, and then a No. 2 test piece was formed in conformance with JIS K-7113 and measured at a tension speed of 50 mm/minute.

2. Tensile Modulus of Elasticity

A wall part of each of the samples A to L was cut out, and a No. 2 test piece was formed at a room temperature (23 degrees Celsius) in conformance with JIS K-7113 and measured at a tension speed of 50 mm/minute.

3. Expansion Ratio

An expansion ratio was calculated by dividing the density of the mixed resin used in each of the first to ninth examples and the first to third comparative examples by an apparent density of the wall part of a corresponding one of the samples A to L.

4. Izod Impact Strength

A wall part of each of the samples A to L was cut out, stored at −20 degrees Celsius, and then test pieces each having 80×10 (length×width mm) were cut out. The cut-out test pieces were stacked so as to have a thickness of 4 mm and, by using this, a measurement was performed in conformance with JIS K-7110 (with a notch).

The obtained results are shown in Table 2.

TABLE 2

| | | TENSILE RUPTURE EXTENSION (%) | TENSILE MODULUS OF ELASTICITY (kg/cm$^2$) | EXPANSION RATIO | IZOD IMPACT STRENGTH (J/m) |
|---|---|---|---|---|---|
| EXAMPLE 1 | SAMPLE A | 71 | 1250 | 2.5 | 23 |
| EXAMPLE 2 | SAMPLE B | 105 | 1010 | 2.1 | 41 |
| EXAMPLE 3 | SAMPLE C | 70 | 1180 | 2.4 | 22 |
| EXAMPLE 4 | SAMPLE D | 59 | 1130 | 2.3 | 20 |

TABLE 2-continued

|  |  | TENSILE RUPTURE EXTENSION (%) | TENSILE MODULUS OF ELASTICITY (kg/cm$^2$) | EXPANSION RATIO | IZOD IMPACT STRENGTH (J/m) |
|---|---|---|---|---|---|
| EXAMPLE 5 | SAMPLE E | 257 | 1140 | 2.5 | 45 |
| EXAMPLE 6 | SAMPLE F | 107 | 1260 | 2.6 | 28 |
| EXAMPLE 7 | SAMPLE G | 210 | 650 | 1.8 | 42 |
| EXAMPLE 8 | SAMPLE H | 27 | 1330 | 2.2 | 10 |
| EXAMPLE 9 | SAMPLE I | 36 | 1200 | 2.1 | 14 |
| COMPARATIVE EXAMPLE 1 | SAMPLE J | 12 | 1830 | 2.5 | 5 |
| COMPARATIVE EXAMPLE 2 | SAMPLE K | 24 | 1170 | 2.5 | 9 |
| COMPARATIVE EXAMPLE 3 | SAMPLE L | 34 | 830 | 2.4 | 8 |

As for the samples A to I of the first to ninth examples, the tensile rupture extension and Izod impact strength at a low temperature were able to be improved. In particular, as for the samples A to F, H, and I of the first to sixth, eighth, and ninth embodiments, the tensile modulus of elasticity at a room temperature is not decreased.

Also, it was found that, compared with the one (second example) obtained by increasing the loading of the hydrogenated styrene-based thermoplastic elastomer by 10 wt % with reference to the first example, the one (fifth example) obtained by adding 10 wt % ethylene-based copolymer has its tensile rupture ductility at a low temperature dramatically improved. The reason for this can be such that, while the hydrogenated styrene-based thermoplastic elastomer contributes to an improvement of impact resistance at a low temperature, an increase of the loading inhibits moldability at the time of foaming to decrease the expansion ratio, make the sample partially thin, and cause variations of air-bubble cells and others.

On the other hand, it was found that in the fifth embodiment, in which the loading of the hydrogenated styrene-based thermoplastic elastomer is suppressed within a range of not affecting a foamed state and a low-density ethylene-based copolymer as a third element is used together, a significant improvement of impact resistance at a low temperature can be observed without degrading the foamed state.

Like the sample J of the first comparative example, in the case where no styrene-based thermoplastic elastomer was added, the tensile rupture extension and Izod impact strength at a low temperature were low and, with an excessive loading thereof, the expansion ratio at a room temperature was extremely decreased. Also, pinholes occurred at the time of molding due to a decrease in expansion ratio and partial thinness, thereby also causing defective molding.

Like the samples K and L of the second and third comparative examples, in the case where an olefin-based thermoplastic elastomer (an ethylene-α-olefin copolymer) was used in place of the styrene-based thermoplastic elastomer, a desired improvement in impact resistance at a low temperature was not achieved.

Next, effects of the samples A to L obtained in the first to ninth embodiments and the first to third comparative examples were evaluated as follows.

1. Falling Ball Impact Test

Toward each of the samples A to L, an iron ball of 1 kg was dropped with varied heights under the condition of −10 degrees Celsius, and the cracking state was evaluated according to the following standards.

⊙: Cracking did not occur even when the ball was dropped at a height of 150 cm.

○: Cracking occurred with dropping at heights of 80 to 140 cm.

Δ: Cracking occurred with dropping at heights of 50 to 80 cm.

x: Cracking occurred with dropping at heights lower than 50 cm.

The obtained results are shown in Table 3.

TABLE 3

|  |  | FALLING BALL IMPACT TEST |
|---|---|---|
| EXAMPLE 1 | SAMPLE A | ○ |
| EXAMPLE 2 | SAMPLE B | ○ |
| EXAMPLE 3 | SAMPLE C | ○ |
| EXAMPLE 4 | SAMPLE D | ○ |
| EXAMPLE 5 | SAMPLE E | ⊙ |
| EXAMPLE 6 | SAMPLE F | ○ |
| EXAMPLE 7 | SAMPLE G | ⊙ |
| EXAMPLE 8 | SAMPLE H | Δ |
| EXAMPLE 9 | SAMPLE I | Δ |
| COMPARATIVE EXAMPLE 1 | SAMPLE J | X |
| COMPARATIVE EXAMPLE 2 | SAMPLE K | X |
| COMPARATIVE EXAMPLE 3 | SAMPLE L | X |

It was found that the samples A to I of the first to ninth examples are excellent in falling-ball impact and impact resistance at a low temperature is improved. Note that the stiffness decreased with a too much loading of the hydrogenated styrene-based thermoplastic elastomer, and the form holding capability as a duct tended to decrease.

Also, the one with an MFR of the hydrogenated styrene-based thermoplastic elastomer and a styrene content each within a predetermined range can be preferable in improving a low-temperature impact resistance strength of the light-weight air conditioning duct for vehicle formed of a polypropylene-based resin in a foamed state.

On the other hand, in the samples J to L of the comparative examples 1 to 3, a falling-ball impulsivity is insufficient, and shattered cracking may occur due to an impact at the time of development of the curtain air bag.

INDUSTRIAL APPLICABILITY

The light-weight air conditioning duct for vehicle according to the present invention can be suitably used as an air conditioning duct for vehicle, in particular, a thin, light-weight roof side duct requiring impact resistance disposed adjacently to a curtain air bag or the like.

Also, the air conditioning duct for vehicle described above contributes to reduction in weight of a vehicle without decreasing various physical properties, such as a mechanical strength.

DESCRIPTION OF REFERENCE NUMERALS

| | |
|---|---|
| 1 | roof side duct (light-weight air conditioning duct for vehicle) |
| 1a | wall part |
| 2 | air supply port |
| 3 | crossing duct |
| 4 | vehicle body panel |
| 5 | air discharge port |
| 6 | interior ceiling material |
| 7 | curtain air bag |
| 8 | extruding head |
| 9 | parison |
| 10 | divided mold |
| 11 | floor duct (light-weight air conditioning duct for vehicle) |
| 12 | closed part |

The invention claimed is:

1. A light-weight air conditioning duct for vehicle for letting conditioned air supplied from an air conditioning unit pass through to a desired location, the duct being obtained by blow-molding a mixed resin including a polypropylene-based resin for foaming and 5 to 40 wt. % of a hydrogenated styrene-based thermoplastic elastomer, and the duct having a closed-cell structure with an expansion ratio equal to or higher than 2.0, and the duct having a tensile rupture extension equal to or higher than 40% at $^-10$ degrees Celsius, and having a tensile modulus of elasticity equal to or higher than 1000 kg/cm2 at a room temperature.

2. The light-weight air conditioning duct for vehicle according to claim 1, wherein the hydrogenated styrene-based thermoplastic elastomer is at least one member selected from the group consisting of a styrene-ethylene butylene-styrene block copolymer, a styrene-ethylene propylene-styrene block copolymer, a hydrogenated styrene-butadiene rubber, and mixtures thereof.

3. The light-weight air conditioning duct for vehicle according to claim 1, wherein the hydrogenated styrene-based thermoplastic elastomer has a styrene content smaller than 30 wt. % and an MFR of 1.0 to 10 g/ten minutes at 230 degrees Celsius.

4. The light-weight air conditioning duct for vehicle according to claim 1, wherein the polypropylene-based resin for foaming is a propylene homopolymer having a long-chain branching structure.

5. The light-weight air conditioning duct for vehicle according to claim 1, wherein the duct having an Izod impact strength equal to or larger than 10 J/m at −20 degrees Celsius.

* * * * *